Figure 1:
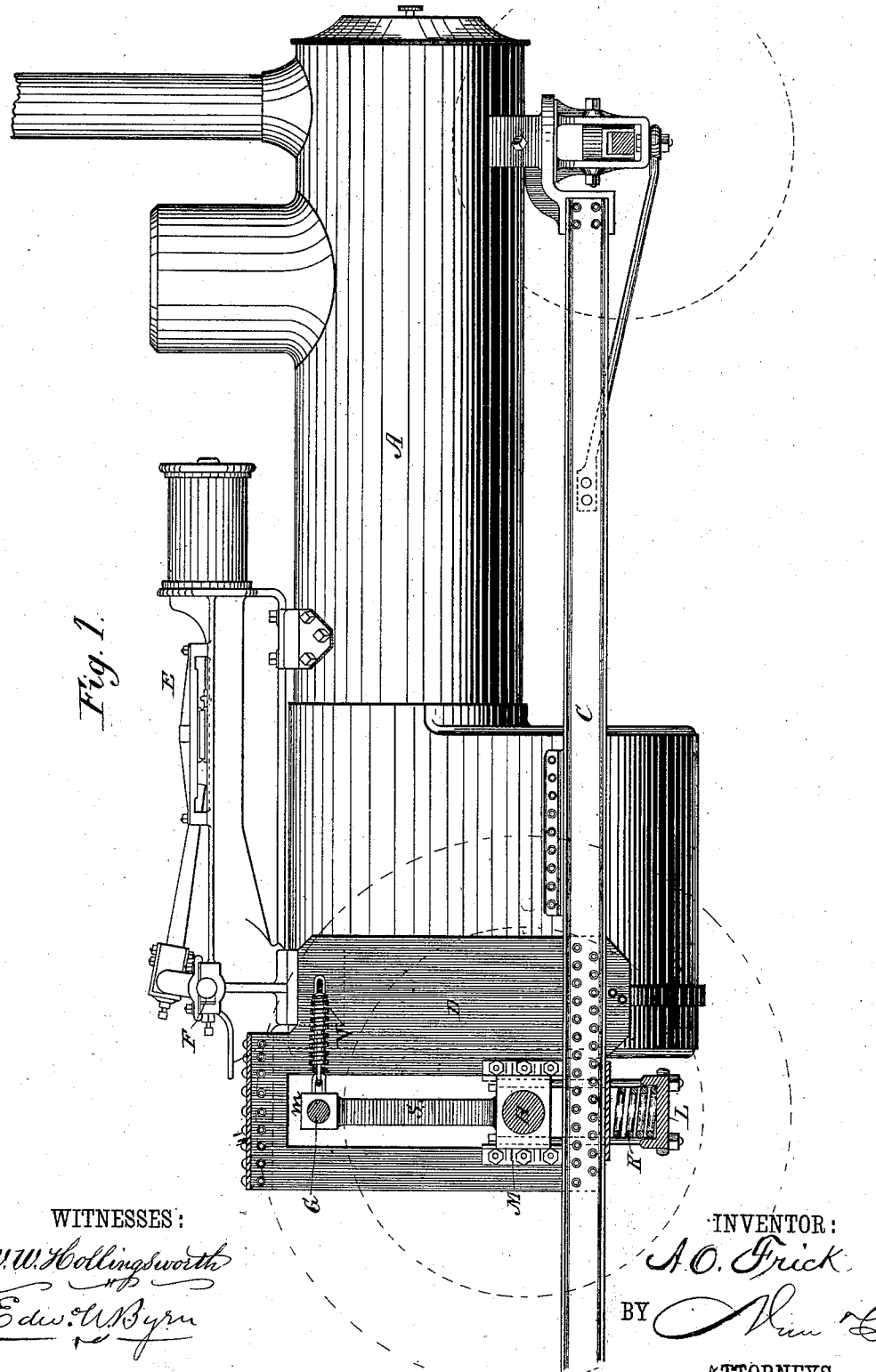

(No Model.)

A. O. FRICK.
TRACTION ENGINE.

No. 263,159. Patented Aug. 22, 1882.

WITNESSES:
W. W. Hollingsworth
Edw. A. Byrn

INVENTOR:
A. O. Frick
BY
ATTORNEYS.

(No Model.) 2 Sheets—Sheet 2.
A. O. FRICK.
TRACTION ENGINE.
No. 263,159. Patented Aug. 22, 1882.
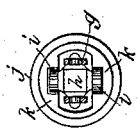
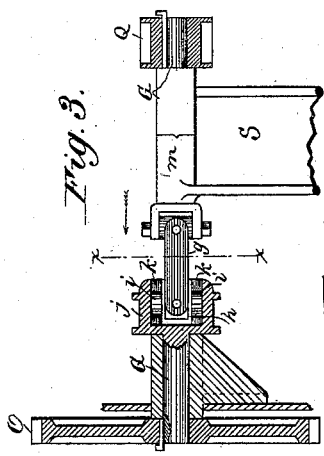
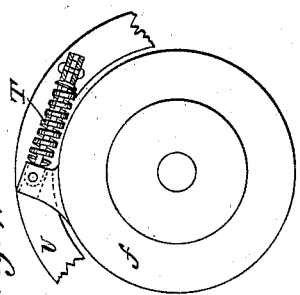
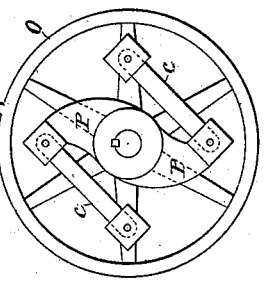
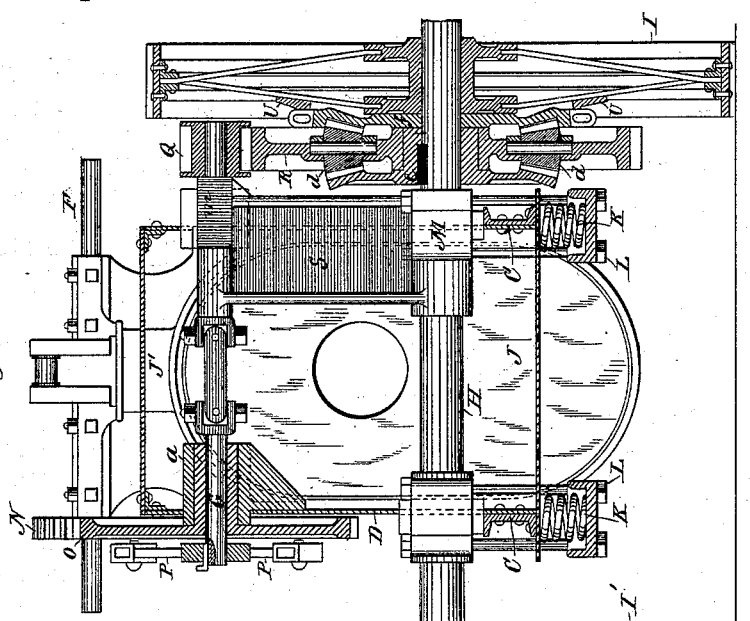
WITNESSES:
W. W. Hollingsworth
Edw. W. Byrn
INVENTOR:
A. O. Frick
BY
ATTORNEYS.

UNITED STATES PATENT OFFICE.

ABRAHAM O. FRICK, OF WAYNESBOROUGH, PENNSYLVANIA.

TRACTION-ENGINE.

SPECIFICATION forming part of Letters Patent No. 263,159, dated August 22, 1882.

Application filed April 19, 1882. (No model.)

*To all whom it may concern:*

Be it known that I, ABRAHAM O. FRICK, of Waynesborough, in the county of Franklin and State of Pennsylvania, have invented a new and Improved Traction-Engine; and I do hereby declare that the following is a full, clear, and exact description of the same, reference being had to the accompanying drawings, forming part of this specification, in which—

Figure 1 is a side elevation of the body of the engine, the position of the driving-wheels being shown in dotted lines; Fig. 2, a rear end view, partly in section; Fig. 3, a view in detail of the counter-shaft and its attachment. Fig. 4 is a side view of the gear $f$ and ring U on the traction-wheel I. Fig. 5 is a side view of the gear O and its connections with the counter-shaft. Fig. 6 is a cross-section through line $x\ x$, Fig. 3.

My invention relates to certain improvements in traction or road engines of the same general construction and function as those for which I have previously filed two applications for patents, bearing date March 7, 1882, and marked "Cases A and B." As in these preceding inventions, the object of my present improvement is, in short, to provide such flexible and elastic connections between the running or traction wheels and the body of the engine and its driving-gear as will adapt the engine to passage over rough roads without involving undue strains upon the working parts. These features of improvement I will fully describe in connection with the other parts shown in the drawings, and then clearly designate them.

In the drawings, A represents the boiler; C, the supporting-sills; D D, the side plates, and E the engine-bed and engine. F is the crank-shaft; G, the counter-shaft, and H the rear axle, carrying the running or traction wheels I I', one of which, I, is loose on the axle and the other, I', rigidly fixed thereto. The general arrangement of these parts is shown in my previous patents and applications for patents, and presents nothing novel in this case.

For supporting the rear end of the engine upon the axle the boiler and its attached parts are fastened to the side sills, C, the side sills connected by a cross-plate, J, in rear of the boiler, and the two ends of this cross-plate just beneath the sills rest upon the tops of spiral springs K. These springs carry the weight of the rear portion of the engine, and they are supported in stirrups L, swung from boxes M around the axle. This constitutes an advantageous mode of arranging the supporting-springs, and enables me to pitch the engine lower down between the running wheels, where its gears are less subject to disturbance from the lateral pitching of the engine over rough roads.

Upon the crank-shaft there is fixed at one end the pinion N, which engages with a toothed wheel O, which has a sleeve that revolves in the bearing $a$, attached to one of the side plates. In the sleeve of this wheel is arranged one end of the counter-shaft G, which, outside of the wheel O, has two rigid arms, P P, keyed to it, that are loosely connected by links $c$ to the toothed wheel, whereby the strain of said toothed wheel is imparted to the counter-shaft. This counter-shaft has a universal joint in it, and at its opposite end has a pinion, Q, keyed to it, that meshes with a toothed wheel, R, that is concentrically arranged about the axle and drives it through the compensating-gears $d\ e\ f$. The jointed character of this counter-shaft and loose connection of the same by links $c$ to the wheel O, so as to permit endwise movement of the counter-shaft, I do not claim in this application as new, as the same is shown in my preceding application, hereinbefore referred to. There is, however, a peculiarity about the character of the universal joint in this counter-shaft which forms a feature of my present invention. Thus, referring to Fig. 3, the links $g$, which connect the two sections of the counter-shaft, are jointed at one end to a block $h$, which, upon an axis at right angles to link-axis, has two diametrical friction-rollers, $i\ i$, which enter guideways $k\ k$ in a clutch-section $j$, formed upon the other portion of the counter-shaft. When this clutch-section revolves with wheel O it will be seen that its inner walls bear against the friction-rollers and rotate the links $g$ and also the other portion of the counter-shaft, and while this result is attained it will be seen that the portion of the counter-shaft bearing pinion Q can move endwise to take up strain, as fully described in my previous application filed March 7, 1882, and marked "Case A,"

for as said section of the counter-shaft moves back and forth the rollers *i i* move back and forth in the guideways *k*, provided for them on the clutch-section. I do not, however, broadly claim a counter-shaft having in it a universal joint and a separate sliding connection, as I am aware that these two features have been used together; but it will be perceived that in my arrangement the universal joint and the sliding connection are so combined that the one forms a part of the other, which enables me to economize space and use these features in a necessarily short transverse counter-shaft; and this also does away with the arms and links P *c*, which I use with the ordinary universal joint, as in Fig. 2.

In communicating the motion of the pinion Q to the wheel R it is of course necessary that the counter-shaft should be always the same distance from the main axle, and this is accomplished by a link, S. Now, I do not claim here this connection of the counter-shaft and axle by a link, as this is shown in my other applications referred to. It will be perceived, however, that the link is here made with a long bearing, *m*, at the top for the counter-shaft and a long bearing, M, below for the axle, which long bearings not only keep the two shafts the same distance apart, but also preserve the parallelism of the said shaft and axle, and prevent the differential endwise movement in them resulting from the fact that they move as radii of different lengths when one end of the axle is raised by an obstruction, as more fully described by diagram in my previous application, Case A.

I will now describe the means for imparting a rotary elastic strain from the gear-wheels to the traction-wheels I I'. The bevel-wheel *e* of the compensating-gear is rigid on the axle and the bevel-gear *f* is loose on the axle, while gear R revolves loosely between them and carries two bevel-pinions, *d d*, that connect the wheels *e* and *f*. This compensating-gear serves to impart the motion of wheel R to either the traction-wheel I or I', so as to permit independent movement in them for turning curves. For driving-wheel I the bevel-gear wheel *f* is connected by tug-springs T to a ring, U, on wheel I, as in Fig. 4, so that the strain on wheel *f* will be imparted in an elastic manner to the traction-wheel I. This tug-spring is constructed as described in my previous application, Case A, so as to act with an elastic strain for driving the engine either forward or backward. These same springs (though placed between bevel-wheel *f* and traction-wheel I) also serve to impart an elastic rotary strain to the other traction-wheel, I', for, supposing wheel I stationary and R under strain, then as *d* tends to strain *e* (and the wheel I') said wheel *d* acts as a lever to throw the other wheel, *f*, back, and this brings into play the tension of springs T to modify the strain on the axle and wheel I'.

I am aware that a single set of springs has been located on the counter-shaft and arranged to modify the rotary strain with an elastic tension for either the one or the other of the traction-wheels; and I am also aware of the Patent No. 252,720. By arranging the single set of springs T between the compensating gear-wheel *f* and the wheel I it is not only made to act for either wheel, but acts much more sensitively for useful effect, for the reason that it is located in closer proximity to the wheels I and I', which alone are subject to be struck by obstructions. It is essential, however, to the result described that the spring T should be constructed as described in Case A, for either forward or backward movement, for without such construction it would not act equally upon both wheels.

The upper end of the link S is loosely guided in a slot in the side plate, D, and the counter-shaft G, which passes through it, is held against horizontal sidewise movement by a tug-spring, V, which is connected to the bearing *m* of link S at one end and to the side plate, D, at the other. This tug-spring is of the same character as T— *i. e.*, it works equally either for a backward or forward strain. The function of this spring V in the location described is twofold. In the first place, when the strain of pinion Q is transmitted to wheel R the tendency of pinion Q is to crawl over the teeth of R, causing this end of the counter-shaft to move sidewise, and if there is a close vertical guide for the top of the link to play in it brings a considerable frictional wear on said guides; but when held by the spring V this end of the counter-shaft G moves freely up and down and also sidewise against the tension of said spring, whose elasticity also serves to make an elastic rotary strain that co-operates with the elastic rotary strain of the tug-springs T. To hold the two side plates in proper position, they are connected and braced by a cross-plate J' at the top.

Having thus described my invention, what I claim as new is—

1. The counter-shaft composed of two parts, combined with and connected by the links *g*, sliding block *h*, with rollers *i*, and hollow clutch-section *j*, having guideways to receive the rollers, as and for the purpose described.

2. The axle and jointed counter-shaft, with the connecting-link S, having long bearings for preserving the equal movement and parallel position of said shaft and axle, in combination with the boiler, the supporting-springs, and the driving-gears of a road-engine, substantially as and for the purpose described.

3. The compensating-gear R *d e f*, combined with and located upon the axle, the loose traction-wheel I, and the tug-spring T, constructed for both forward and backward motion, and connecting the traction-wheel I to the gear *f*, substantially as and for the purpose described.

4. The combination, with the axle, the freely-moving counter-shaft, and a link connecting said axle and counter-shaft, of a gear-wheel arranged concentrically upon the axle, a pinion meshing in the same and arranged on the counter-shaft, and a spring for resisting the tendency of the pinion to crawl or move peripherally over the gear-wheel on the axle, as described.

5. The side plates, D D, connected at the top by plate J' and at the bottom by plate J, in combination with the jointed counter-shaft, the stationary bearing $a$, the link S, the axle, the connecting-gears, the boiler, and the supporting-springs, as and for the purpose described.

ABRAHAM O. FRICK.

Witnesses:
EDW. W. BYRN,
CHAS. A. PETTIT.